United States Patent
Hwang et al.

(10) Patent No.: US 10,181,763 B2
(45) Date of Patent: Jan. 15, 2019

(54) MOTOR THAT INCLUDES A STATOR HAVING AN IMPROVED STRUCTURE

(71) Applicant: Samsung Electronics Co., Ltd, Suwon-si (KR)

(72) Inventors: Woong Hwang, Suwon-si (KR); Yong Woo Nam, Seoul (KR); Uk Ho Seo, Bucheon-si (KR); Sung Gu Lee, Anyang-si (KR); Su Kwon Jeong, Suwon-si (KR); Young Kwan Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 15/010,996

(22) Filed: Jan. 29, 2016

(65) Prior Publication Data
US 2016/0226331 A1    Aug. 4, 2016

(30) Foreign Application Priority Data
Jan. 30, 2015  (KR) ........................ 10-2015-0015405

(51) Int. Cl.
*H02K 3/52*        (2006.01)
*H02K 5/22*        (2006.01)
(Continued)

(52) U.S. Cl.
CPC .............. *H02K 5/08* (2013.01); *H01R 39/32* (2013.01); *H02K 3/522* (2013.01); *H02K 5/225* (2013.01);
(Continued)

(58) Field of Classification Search
CPC ....................... H02K 3/52–3/528; H02K 3/32; H02K 3/325; H02K 5/225
(Continued)

(56) References Cited

U.S. PATENT DOCUMENTS

| 5,350,960 A | 9/1994 | Kiri et al. |
| 6,531,796 B1 * | 3/2003 | Konno ................... H02K 3/522 310/254.1 |

(Continued)

FOREIGN PATENT DOCUMENTS

| EP | 1 265 341 | 12/2002 |
| JP | H07250445 | 9/1995 |

(Continued)

OTHER PUBLICATIONS

Machine Translation, Kurabayashi, JP 2010187434 A, Aug. 2010.*
(Continued)

*Primary Examiner* — Thomas Truong

(57) ABSTRACT

A motor that includes a stator having an improved structure is provided. The motor includes a stator that includes stator cores wound with a coil, a rotor disposed in the stator and configured to interact with the stator and to rotate, a shaft mounted on the rotor and configured to rotate with the rotor, a printed circuit board (PCB) electrically connected to the coil, an insulator formed of an insulating material and mounted on the stator, and a terminal pin mounted on the insulator to connect the coil with the PCB. A terminal pin accommodating portion that protrudes in an extension direction of the shaft is provided in one side of the insulator and the terminal pin is accommodated in the terminal pin accommodating portion.

18 Claims, 18 Drawing Sheets

(51) Int. Cl.
*H02K 11/00* (2016.01)
*H02K 5/08* (2006.01)
*H01R 39/32* (2006.01)
*H02K 11/30* (2016.01)
*H02K 11/33* (2016.01)

(52) U.S. Cl.
CPC .............. *H02K 11/30* (2016.01); *H02K 11/33* (2016.01); *H02K 2203/03* (2013.01); *H02K 2203/09* (2013.01)

(58) Field of Classification Search
USPC .................................. 310/71, 214, 215, 194
See application file for complete search history.

(56) References Cited

U.S. PATENT DOCUMENTS

| | | |
|---|---|---|
| 2007/0001528 A1 | 1/2007 | Umegaki et al. |
| 2011/0089776 A1 | 4/2011 | Kinpara et al. |
| 2013/0038146 A1 | 2/2013 | Hofmann et al. |

FOREIGN PATENT DOCUMENTS

| | | |
|---|---|---|
| JP | 2005-261089 | 9/2005 |
| JP | 2010-187434 | 8/2010 |
| JP | 2010187434 A * | 8/2010 |
| JP | 2012223030 A * | 11/2012 |
| KR | 10-2008-0032959 | 4/2008 |
| KR | 10-2014-0050619 | 4/2014 |
| WO | WO 97/00550 | 1/1997 |
| WO | WO 2013/187585 | 12/2013 |

OTHER PUBLICATIONS

Machine Translation, Kawamura, JP 2012223030 A, Nov. 2012.*
Invitation pursuant to Rule 137(4) EPC and Article 94(3) EPC dated Dec. 23, 2016 in connection with European Patent Application No. 16 153 474.8.
Foreign Communication From a Related Counterpart Application, European Application No. 16153474.8-1801, Invitation Pursuant to Rule 137(4) and Article 94(3) EPC dated Dec. 23, 2016, 3 pages.
Communication pursuant to Article 94(3) EPC dated Apr. 5, 2017 in connection with European Patent Application No. 16 153 474.8.
Invitation Pursuant to Rule 137(4) EPC and Article 94(3) EPC for European Application No. 16153474.8, dated Nov. 9, 2017. (2 pages).
International Search Report dated Apr. 28, 2016 in connection with International Application No. PCT/KR2016/000857; 3 pages.
Extended European Search Report dated Jun. 15, 2016 in connection with European Application No. 16153474.8; 8 pages.

* cited by examiner

MOTOR THAT INCLUDES A STATOR HAVING AN IMPROVED STRUCTURE

CROSS-REFERENCE TO RELATED APPLICATION(S) AND CLAIM OF PRIORITY

The present application is related to and claims the benefit of Korean Patent Application No. 2015-0015405, filed on Jan. 30, 2015 in the Korean Intellectual Property Office, the disclosure of which is incorporated herein by reference.

TECHNICAL FIELD

Embodiments of the present invention relate to a motor which includes a stator having an improved structure.

BACKGROUND

Home appliances such as air conditioners each include a motor for driving a compressor or an air blower. A motor includes a stator, a rotor, and a printed circuit board (PCB). The stator may include a body formed of an insulator and stator coils provided in the body to form a magnetic field. The rotor may rotate due to the magnetic field formed by the stator. The PCB may include a circuit pattern printed thereon, and various circuit devices, or the like may be mounted thereon. The PCB may be electrically connected to the stator coils and may control an operation of the stator. The stator coil may be electrically connected to the PCB using a terminal pin. The stator coil may be connected to the terminal pin and the terminal pin may be electrically connected to the PCB using a method such as soldering or the like.

SUMMARY

To address the above-discussed deficiencies, it is a primary object to provide, for use in a motor capable of preventing an injection material from penetrating into a gap between a terminal pin of a stator and a mold while a motor housing is injection-molded. Additional aspects of the invention will be set forth in part in the description which follows and, in part, will be obvious from the description, or may be learned by practice of the invention.

In accordance with one aspect of the present invention, a motor includes a stator which includes stator cores wound with a coil, a rotor disposed in the stator to interact with the stator and to rotate, a shaft mounted on the rotor to rotate together with the rotor, a printed circuit board (PCB) electrically connected to the coil, an insulator formed of an insulating material and mounted on the stator, and a terminal pin mounted on the insulator to connect the coil with the PCB. Here, a terminal pin accommodating portion which protrudes in an extension direction of the shaft is provided in one side of the insulator and the terminal pin is accommodated in the terminal pin accommodating portion.

The terminal pin accommodating portion may include a terminal pin supporting portion which further protrudes in the extension direction of the shaft. An end of the terminal pin may externally protrude through a through hole formed in the terminal pin supporting portion. The motor may further include a housing which forms an external shape and is integrally injection-molded with the stator.

During the injection molding of the housing, the terminal pin may be located in an accommodating portion which is a space formed in a mold and the terminal pin supporting portion may be in contact with the mold located around the accommodating portion to shield the accommodating portion not to allow an injection material to flow therein. The terminal pin may be provided in a bent shape. The terminal pin may include a first terminal pin and a second terminal pin which extend in the same direction and a third terminal pin which connects the first terminal pin with the second terminal pin.

The second terminal pin may be externally exposed through a through hole formed in the terminal pin accommodating portion. The second terminal pin may be connected to the PCB through soldering. The coil may be connected to the first terminal pin. A length of the second terminal pin may be greater than a length of the first terminal pin. The terminal pin accommodating portion may include a terminal pin supporting portion which further protrudes in the extension direction of the shaft, and a through hole may be formed in one side of the terminal pin supporting portion. The second terminal pin may pass through a through hole formed in the terminal pin supporting portion and may be electrically connected to the PCB. The terminal pin may be fixed to the terminal pin accommodating portion through a hook structure. The insulator may be injection-molded while the terminal pin is inserted therein to be located in the terminal pin accommodating portion.

In accordance with another aspect of the present invention, a motor includes a housing which forms an external shape, a stator body which includes stator cores wound with a coil, an insulator formed of an insulating material and mounted on one side of the stator body, a PCB provided on the one side of the stator body, and a terminal pin mounted on the insulator to electrically connect the coil with the PCB. Here, the insulator includes a terminal pin accommodating portion formed to protrude toward one side, the terminal pin accommodating portion includes a terminal pin supporting portion which further protrudes toward the one side, and the terminal pin externally protrudes through a through hole formed in the terminal pin supporting portion.

The terminal pin may be formed to be bent in such a way that one side externally protrudes through a through hole formed in the terminal pin accommodating portion and another side externally protrudes through a through hole formed in the terminal pin supporting portion. The one side of the terminal pin may have a protruding length from the terminal pin accommodating portion, smaller than that of the other side of the terminal pin. When the housing is injection-molded while the stator body is inserted, the terminal pin supporting portion may be in surface contact with a mold. The mold may include an accommodating portion which accommodates the protruding terminal pin, and the terminal pin supporting portion may shield the accommodating portion not to allow an injection material to flow therein.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged motor. Hereinafter, a motor 1 in accordance with one embodiment of the present invention will be described in detail with reference to the attached drawings.

Figure 1:
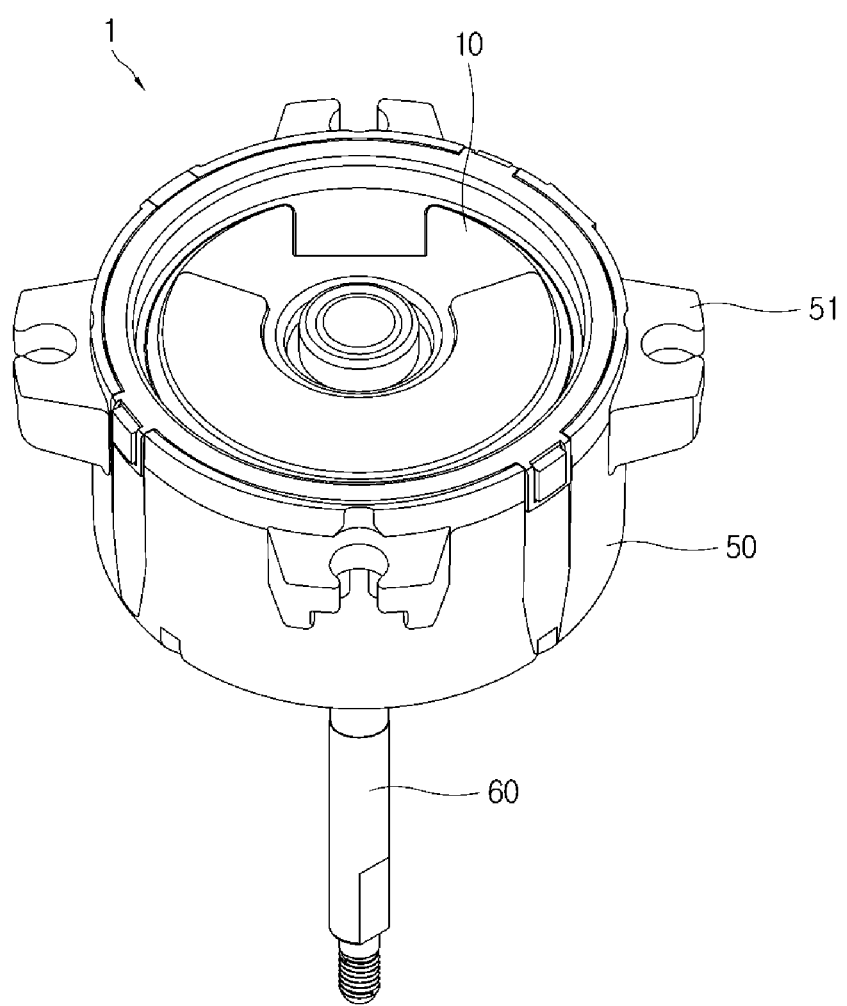
FIG. 1 is a perspective view of a motor according to this disclosure.
Figure 2:
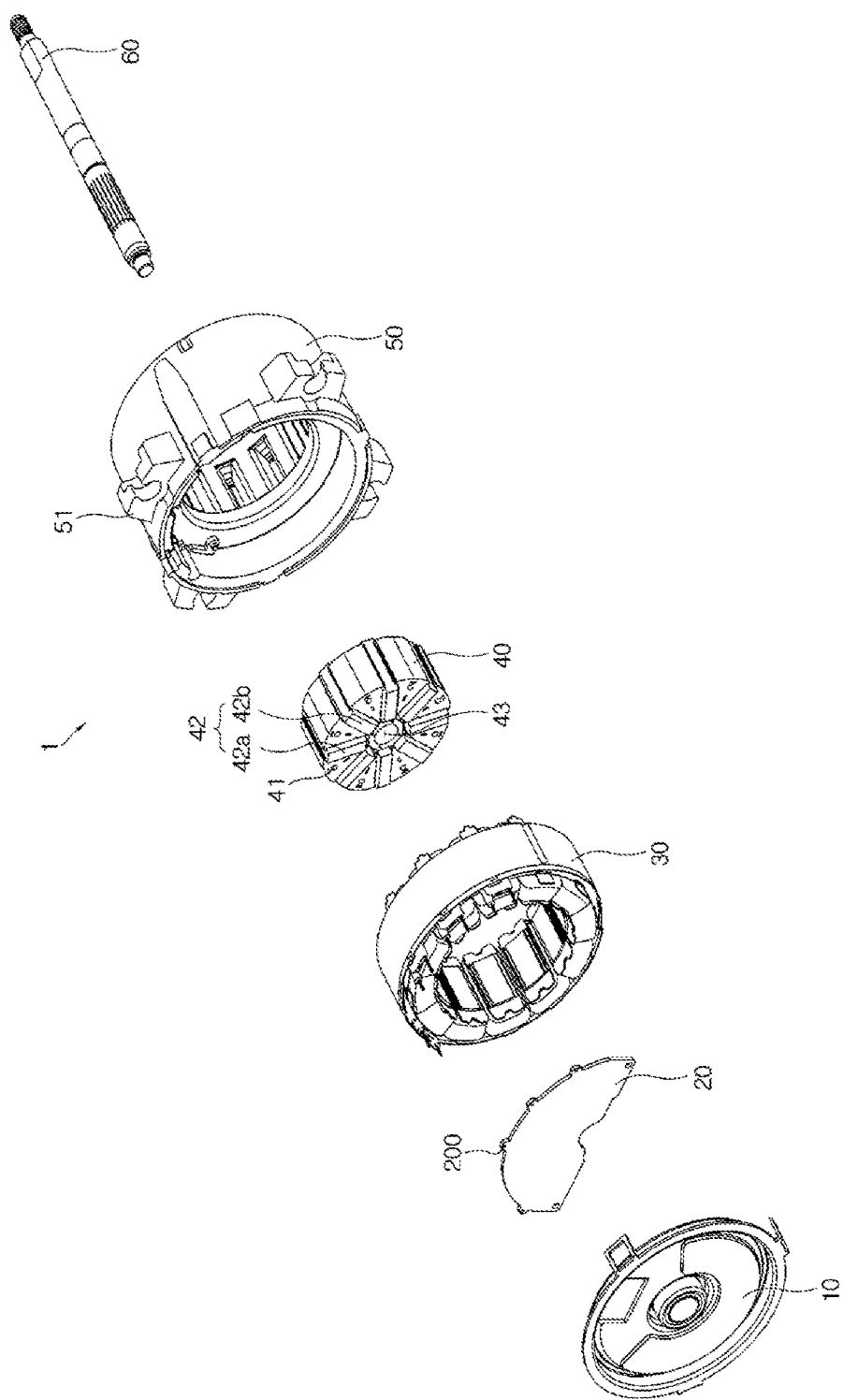
FIG. 2 is an exploded perspective view of the motor according to this disclosure.

FIG. 1 is a perspective view of the motor 1 according to this disclosure. FIG. 2 is an exploded perspective view of the motor 1 according to this disclosure. Referring to FIGS. 1 and 2, the motor 1 in accordance with one embodiment includes a stator 30, a rotor 40, and a housing 50 which accommodates the stator 30 and the rotor 40. The stator 30 may be provided to have a cylindrical shape, and the rotor 40 may be provided to rotate while interacting with the stator 30. The rotor 40 may be provided in the stator 30. One side of the housing 50 may be covered by a motor cover 10.

A printed circuit board (PCB) 20 may be located on one side of the stator 30. The stator 30 may be in electric contact with the PCB 20. The PCB 20 may include a circuit pattern printed thereon, and various circuit components may be mounted thereon. The PCB 20 may include connection portions 200 to be electrically connected to the stator 30. The connection portion 200 may be provided to be in a hole shape formed on an outer edge of the PCB 20.

The stator 30 may be accommodated fixedly into the housing 50. The stator 30 includes a body 31 and stator coils 32 provided in the body 31 to form a magnetic field. The body 31 may be provided to have a cylindrical shape to allow the rotor 40 to be located therein. Stator cores 310 may be disposed along an inner circumferential surface of the body 31 at certain intervals. The stator coil 32 may be wound on the stator core 310. An extension core portion 311 formed by partially extending a width of the stator core 310 may be provided in an internal end of the stator core 310.

The stator coil 32 may be provided to be electrically connected to the PCB 20 to receive an electric signal. The stator 30 may include terminal pins 300 to which the stator coils 32 are connected, respectively. The stator coil 32 may be electrically connected to the PCB 20 through the terminal pin 300. The terminal pin 300 may be formed of a metal material which has high electrical conductivity. The stator coil 32 may be coupled with one side of the terminal pin 300. Another side of the terminal pin 300 may be mounted and soldered onto the connection portion 200 provided on the PCB 20. Hereby, the stator coil 32 and the PCB 20 may be electrically connected.

The rotor 40 may be located in an internal space of the stator 30 while being spaced apart from the stator cores 310 at certain intervals to rotate. The rotor 40 includes a rotor body 41 and permanent magnets 42 inserted into the rotor body 41. A shaft insertion hole 43 for allowing a shaft 60 to be inserted therein may be provided in a center of the rotor 40. The permanent magnets 42 may be radially located around the shaft insertion hole 43. An inner end of the permanent magnet 42 may be disposed to be adjacent to the shaft insertion hole 43 and an outer end thereof may be disposed to be adjacent to the stator 30. A first permanent magnet 42a and a second permanent magnet 42b adjacent to each other among the permanent magnets 42 may be disposed to allow mutually identical polarities thereof to face each other.

The rotor 40 may rotate due to an electromagnetic field formed by the stator 30. The shaft 60 may be mounted in the center of the rotor 40 to rotate together with the rotor 40. The shaft 60 may be exposed outside the housing 50 through a hole (not shown) formed in one side of the housing 50. The housing 50 may be integrally injection-molded together with the stator 30. The rotor 40 may be rotatably accommodated in the housing 50. The rotor 40 may be rotatably located in the cylindrical shape formed by the stator 30. An opening 500 formed in one side of the housing 50 may be covered by the motor cover 10. The housing 50 may include a coupling portion 51 to which a coupling member capable of fixing the motor 1 is coupled.

Figure 3:
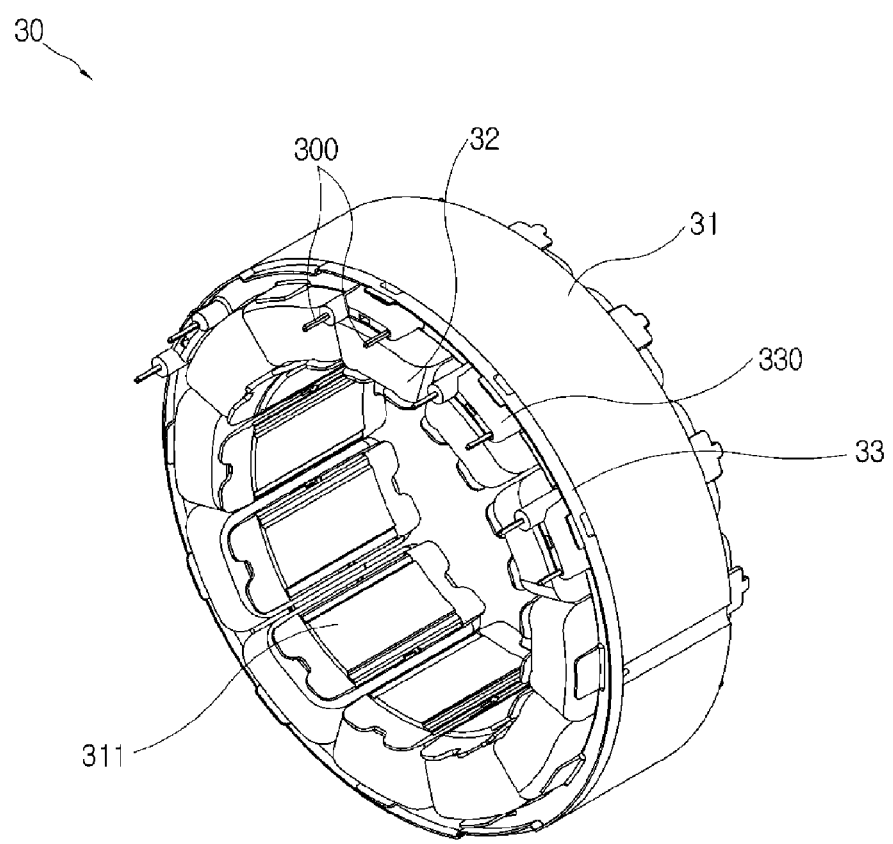
FIG. 3 is a perspective view of a stator according to this disclosure.
Figure 4:
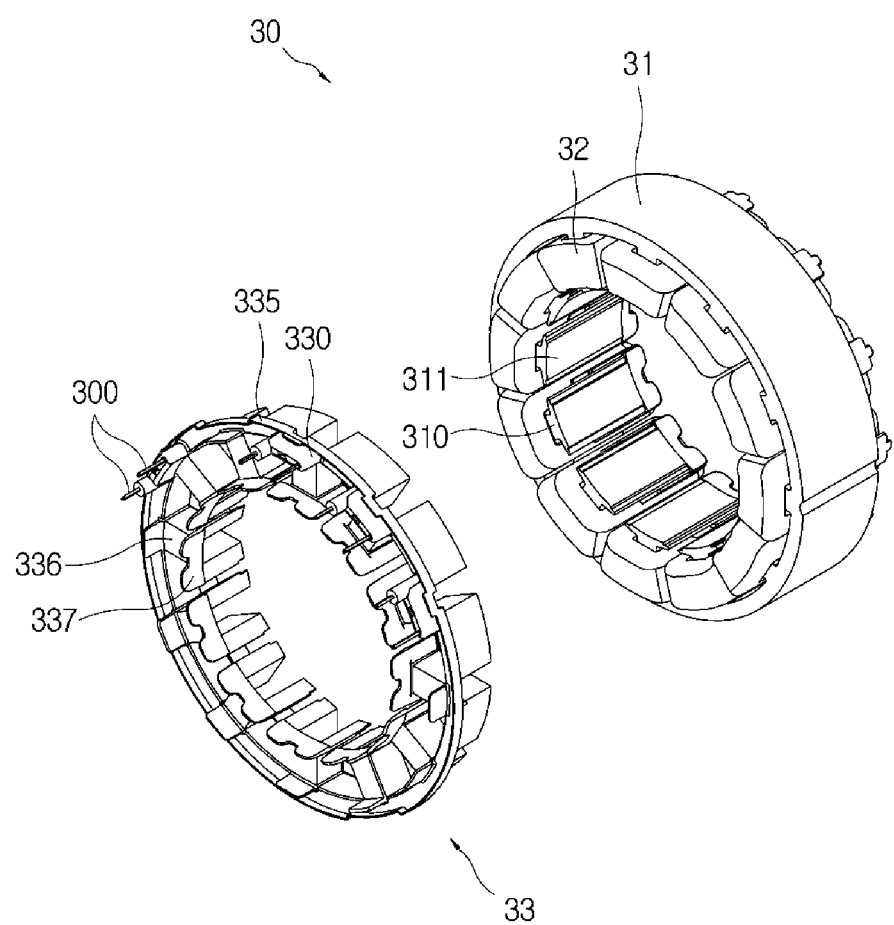
FIG. 4 is an exploded perspective view of the stator according to this disclosure.
Figure 5:
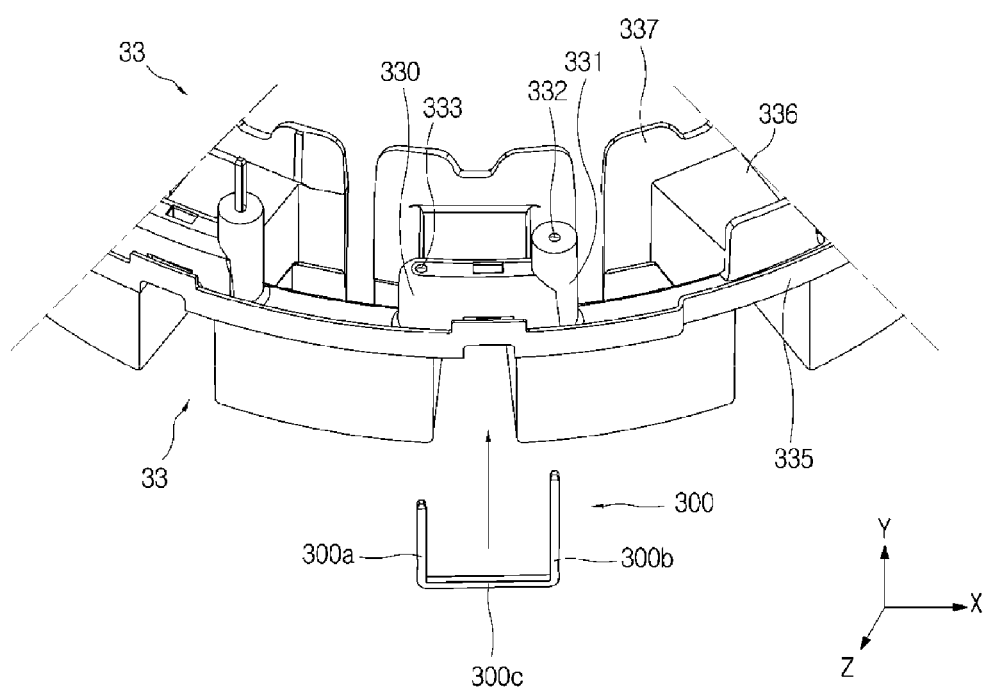
FIG. 5 is a partial view of an insulator according to this disclosure.

FIG. 3 is a perspective view of the stator 30 according to this disclosure. FIG. 4 is an exploded perspective view of the stator 30 according to this disclosure. FIG. 5 is a partial view of an insulator 33 according to this disclosure. Referring to FIGS. 3 to 5, the stator 30 includes the cylindrical body 31 and the stator coils 32 wound on the body 31. The stator coils 32 may be wound on the stator cores 310 provided along the inner circumferential surface at certain intervals. The stator 30 may further include the insulator 33. The insulator 33 may be formed of an electric insulation material. The insulators 33 may be disposed on both sides of the body 31 in an axial direction to cover the stator cores 310. The stator coils 32 may be wound on an outer circumferential surface of the insulator 33 which covers the stator cores 310.

The insulator 33 provided on one side of the body 31 may include an annular rim 335, coil supporting portions 336 disposed to correspond to the stator cores 310, and coil guide portions 337 provided to protrude inward in a radial direction of the coil supporting portions 336. The coil supporting portions 336 may be disposed to be spaced apart in a circumferential direction. The stator coil 32 may be wound on the coil supporting portion 336 which surrounds the stator core 310 while the insulators 33 are coupled with the body 31.

The terminal pins 300 for allowing the stator coil 32 to be electrically connected to the PCB 20 may be mounted on the insulator 33. The terminal pins 300 may be mounted on terminal pin accommodating portions 330 formed on the insulator 33. The terminal pin accommodating portions 330 may be provided to protrude from the annular rim 335 of the insulator 33 in the axial direction. When a direction in which the terminal pin accommodating portions 330 protrude is referred to be forward, insertion holes) are provided in the rear of the terminal pin accommodating portions 330 and the terminal pins 300 may be accommodated in the terminal pin accommodating portions 330 from the rear of the terminal pin accommodating portions 330 through the insertion holes.

The terminal pin 300 may be provided to be bent as approximately a U shape or a V shape. The terminal pin 300 may include a first terminal pin 300a and a second terminal pin 300b which extend in the same direction. The first terminal pin 300a and the second terminal pin 300b may be connected by a third terminal pin 300c. A length of the second terminal pin 300b extending from the third terminal pin 300c may be greater than a length of the first terminal pin 300a extending from the third terminal pin 300c.

The terminal pin accommodating portion 330 may include first and second through holes 332 and 333 to allow the first terminal pin 300a and the second terminal pin 300b to pass therethrough. The first terminal pin 300a may be inserted into the first through hole 332, and the second terminal pin 300b may be inserted into the second through hole 333. The first terminal pin 300a may pass through the first through hole 332 to externally protrude. The protruding first terminal pin 300a may be connected to the stator coil 32. The second terminal pin 300b may pass through the second through hole 333 to externally protrude. The protruding second terminal pin 300b may be inserted into and soldered onto the connection portion 200 formed in the PCB 20. Hereby, the stator coil 32 and the PCB 20 may be electrically connected.

The terminal pin accommodating portion 330 may include a terminal pin supporting portion 331 which partially extends in the axial direction. The second through hole 333 into which the second terminal pin 300b is inserted may be formed in an end of the terminal pin supporting portion 331. The second terminal pin 300b which is relatively long may be stably supported by the terminal pin supporting portion 331.

In general, a coil is connected to a terminal pin which is not bent and has a straight shape unlike the embodiment of the present invention and the terminal pin to which the coil is connected is provided to protrude outside an edge of an insulator. In this case, the terminal pin may be pressurized by a mold while a housing is injection-molded, thereby damaging the coil. Accordingly, to prevent the damage of the terminal pin, an additional bracket covers the insulator and then the housing is injection-molded. Accordingly, a process of manufacturing a motor becomes complicated and the production cost per unit increases.

In the embodiment of the present invention, to omit the additional bracket to prevent the damage of the terminal pin during the injection molding of the housing, the terminal pin accommodating portions 330 which protrude in the axial direction are to be provided on the rim 335 of the insulator 33. The terminal pin 300 is provided to be bent in such a way that the stator coil 32 is wound on the first terminal pin 300a with a relatively short extension length and the second terminal pin 300b with a relatively long extension length is to be coupled with the PCB 20, thereby allowing the first terminal pin 300a wound with the stator coil 32 to be located in the housing 50 and allowing the second terminal pin 300b to be externally exposed to be connected to the PCB 20 during injection molding. Hereinafter, a structure for preventing a damage of the terminal pin 300 during the injection molding of the housing 50 will be described.

Figure 6:
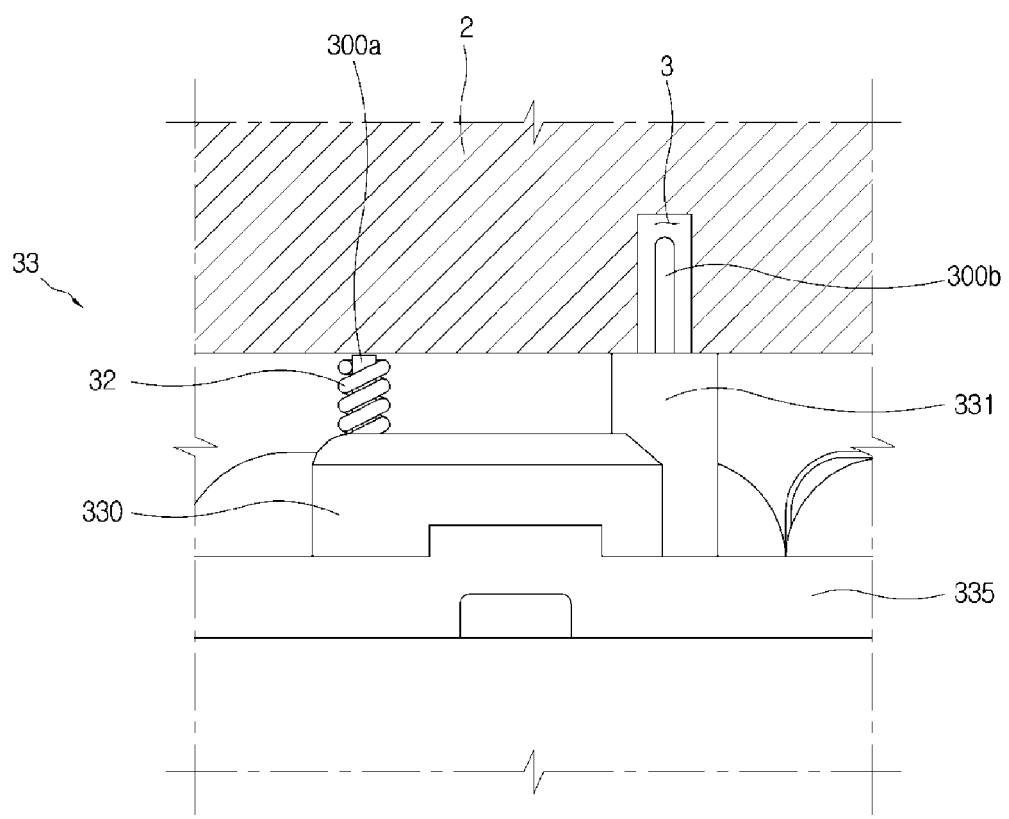
FIG. 6 is a view illustrating a part of the stator and a mold according to this disclosure.

FIG. 6 is a view illustrating a part of the stator 30 and a mold 2 according to this disclosure. Referring to FIG. 6, the stator 30 may be integrally injection-molded together with the housing 50. During the injection molding of the housing 50, to protect the terminal pin 300 which protrudes from the insulator 33 from being damaged, the mold 2 may include an accommodating portion 3 in which the terminal pin 300 can be accommodated.

When a housing is injection-molded while a stator is inserted into a mold, an injection material penetrates into a gap between the mold and a terminal pin and is stuck to an outer circumferential surface of the terminal pin. When the injection material is stuck to the outer circumferential surface of the terminal pin, connection with a PCB may be poor. The terminal pin supporting portion 331 which further protrudes from the terminal pin accommodating portion 330 in the axial direction may be provided and the second terminal pin 300b may be exposed outside the terminal pin supporting portion 331 through the second through hole 333 formed in the end of the terminal pin supporting portion 331.

During the injection molding of the housing 50, the first terminal pin 300a may be located in the housing 50. The first terminal pin 300a may be located in a space into which an injection material is injected. Here, a length of the first terminal pin 300a protruding from one surface of the terminal pin accommodating portion 330 may be smaller than or identical to a length of the terminal pin supporting portion 331 protruding from the one surface of the terminal pin accommodating portion 330.

The second terminal pin 300b exposed outside the terminal pin supporting portion 331 may be accommodated in the accommodating portion 3 provided in the mold 2. One surface of the terminal pin supporting portion 331 may be in surface contact with the mold 2 located around the accommodating portion 3. The one surface of the terminal pin supporting portion 331 is in surface contact with the mold 2 in such a way that the accommodating portion 3 in which the second terminal pin 300b is accommodated may be shielded by the one surface of the terminal pin supporting portion 331. Even though the injection material is injected into a space in which the stator 30 is located, since the accommodating portion 3 is shielded by the one surface of the terminal pin supporting portion 331, the injection material does not flow into the accommodating portion 3. Hereby, during the injection molding of the housing 50, it may be prevented that the injection molding is performed to allow the injection material to be stuck to an outer circumferential surface of the second terminal pin 300b to deteriorate current carrying.

Figure 7A:
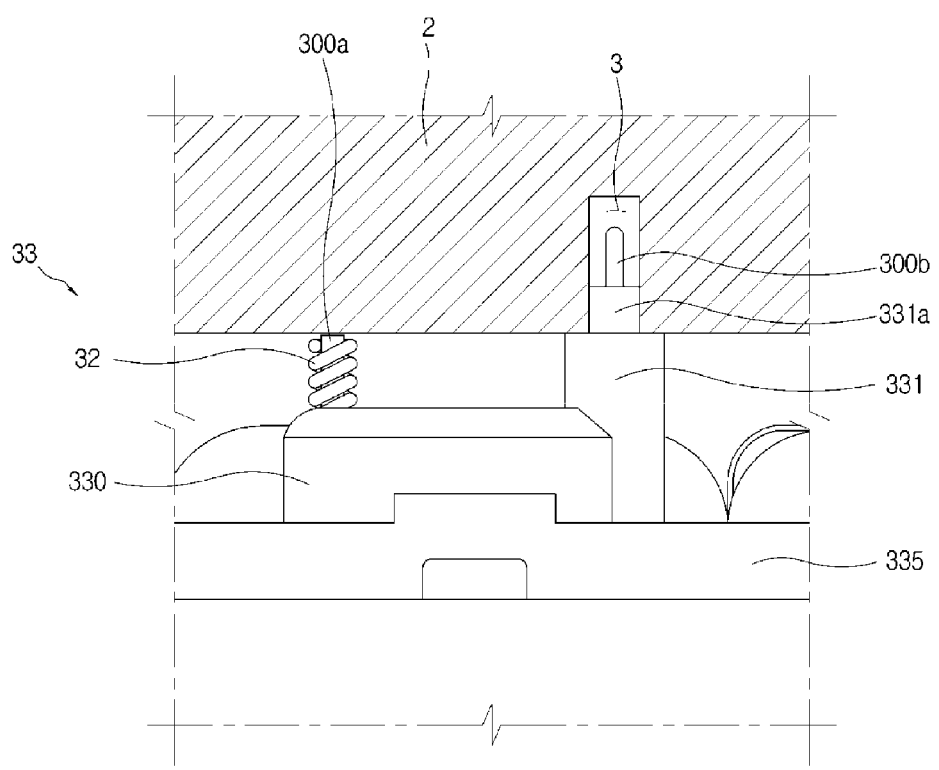
FIGS. 7A to 8 are views illustrating various shapes of an insulator according to this disclosure.
Figure 7B:
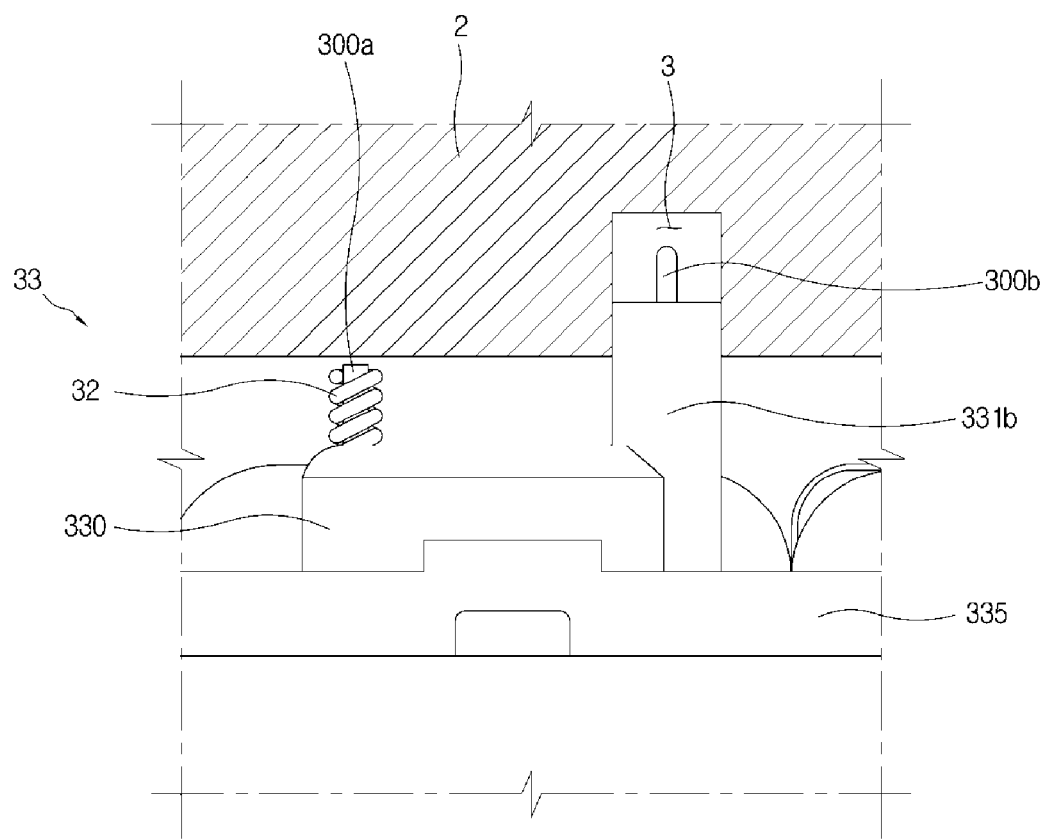
Figure 8:
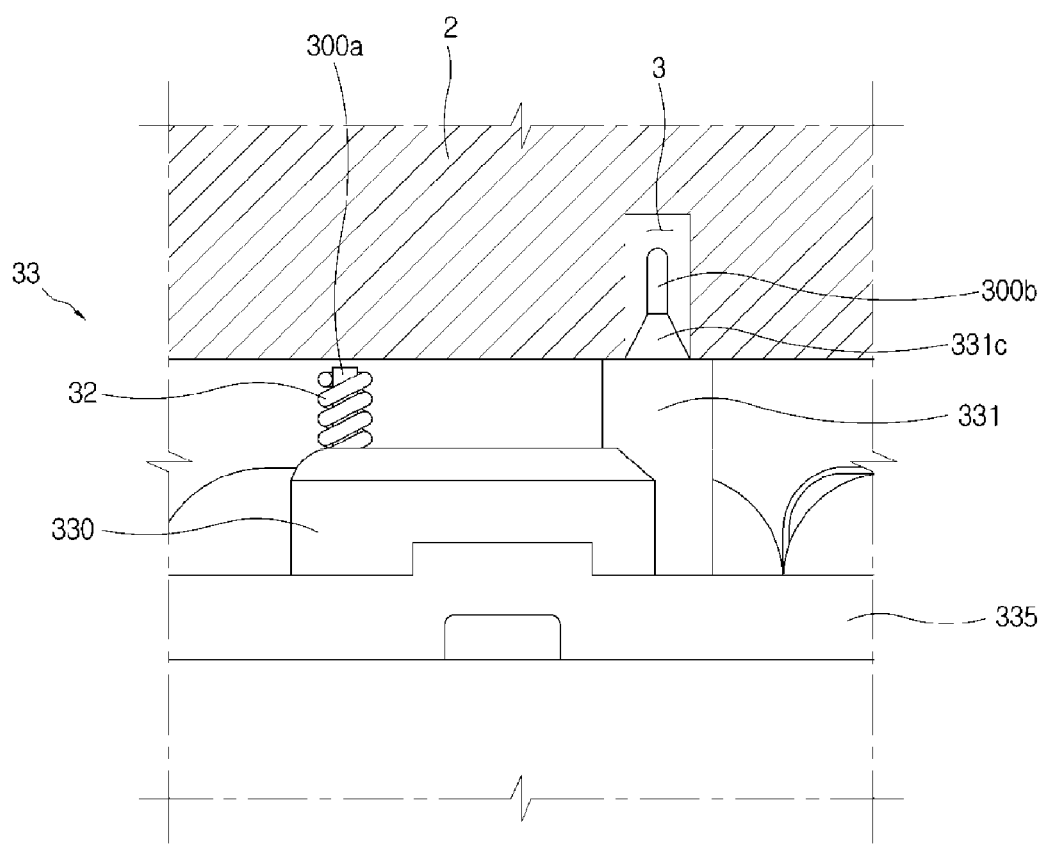

FIGS. 7A to 8 are views illustrating various shapes of the insulator 33 according to this disclosure. Referring to FIGS. 7A to 8, the terminal pin supporting portion 331 provided in the insulator 33 may have various shapes. The terminal pin supporting portion 331 may have various shapes to shield the accommodating portion 3 formed in the mold 2 to accommodate the second terminal pin 300b during the injection molding of the housing 50 to prevent the occurrence of a gap between the accommodating portion 3 and the space into which the injection material is injected.

As an example, referring to FIG. 7A, an extension portion 331a which further protrudes from the one surface of the terminal pin supporting portion 331 may be provided. The extension portion 33 1a may be provided to be stepped from the one surface of the terminal pin supporting portion 331. That is, a diameter of the extension portion 331a may be smaller than a diameter of the terminal pin supporting portion 331. The second terminal pin 300b may protrude from the extension portion 331a.

During the injection molding of the housing 50, the extension portion 331a may be inserted into the accommodating portion 3 formed in the mold 2. The one surface of the terminal pin supporting portion 331, which forms a step from the extension portion 331a, may be in surface contact with the mold 2 located around the accommodating portion 3. The accommodating portion 3 may be shielded by the extension portion 311a and the terminal pin supporting portion 331 to prevent the occurrence of the gap between the accommodating portion 3 and the space into which the injection material is injected.

As another example, referring to FIG. 7B, a part of a terminal pin supporting portion 331b may be provided to be inserted into the accommodating portion 3. A side of the terminal pin supporting portion 331b may be in surface contact with an inner surface of the mold 2, which forms the accommodating portion 3. The terminal pin supporting portion 331b is inserted into the accommodating portion 3 and in surface contact with the inner surface of the mold 2, which forms the accommodating portion 3, thereby shielding the accommodating portion 3 to prevent the occurrence of the gap between the accommodating portion 3 and the space into which the injection material is injected.

As still another example, referring to FIG. 8, an extension portion 331c which further protrudes from the one surface of the terminal pin supporting portion 331 may be provided. A side portion of the extension portion 331c is inclined unlike the shape of FIG. 7A. That is, a diameter of the side portion of the extension portion 331c may be formed to become smaller as farther from the terminal pin supporting portion 331. Similarly to FIG. 7A, the one surface of the terminal pin supporting portion 331 may be in surface contact with the mold 2 located around the accommodating portion 3. The accommodating portion 3 formed in the mold 2 may be shielded by the inclined side portion of the extension portion 331c from the space into which the injection material is injected.

During the injection molding of the housing 50, the accommodating portion 3 which accommodates the second terminal pin 300b may be shielded by the terminal pin supporting portion 331, thereby preventing the injection material from flowing into the accommodating portion 3. The shapes of the terminal pin supporting portions 331 and 331b or the extension portions 331a and 331c capable of shielding the accommodating portion 3 are not limited to the described above.

Figure 9:
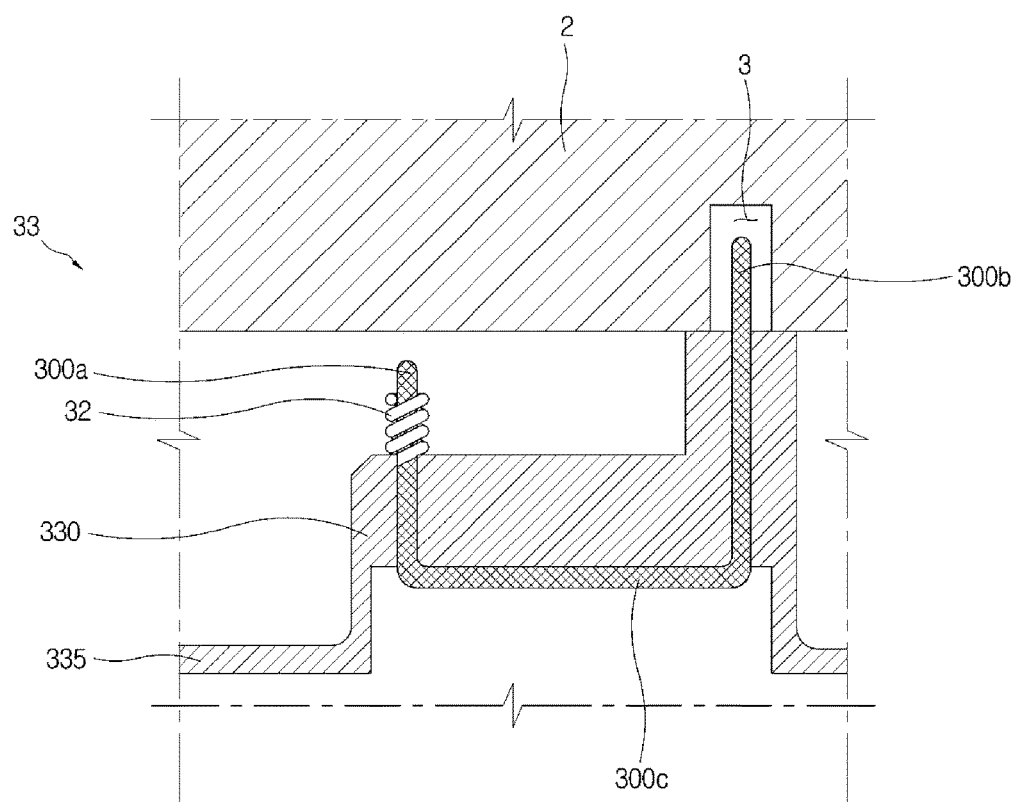
FIGS. 9 to 13 are views illustrating various structures of fixing a terminal pin into the insulator according to this disclosure.

FIGS. 9 to 13 are views illustrating various structures of fixing the terminal pin 300 into the insulator 33 according to this disclosure. Referring to FIGS. 9 to 13, the terminal pin 300 may be accommodated fixedly in the terminal pin accommodating portion 330. In FIGS. 9 to 13, the terminal pin 300 is inserted into the terminal pin accommodating portion 330 from the rear thereof but may be inserted into the terminal pin accommodating portion 330 from a front thereof. Hereinafter, a case in which the terminal pin 300 is inserted into the terminal pin accommodating portion 330 from the rear thereof and exposed outside the terminal pin accommodating portion 330 through the through holes 332 and 333 will be described. Referring to FIG. 9, the terminal pin 300 may be pressed fixedly in the terminal pin accommodating portion 330. That is, the terminal pin 300 may be inserted into the terminal pin accommodating portion 330 from the rear thereof and may be pressed fixedly therein without an addition fixing device.

Figure 10A:
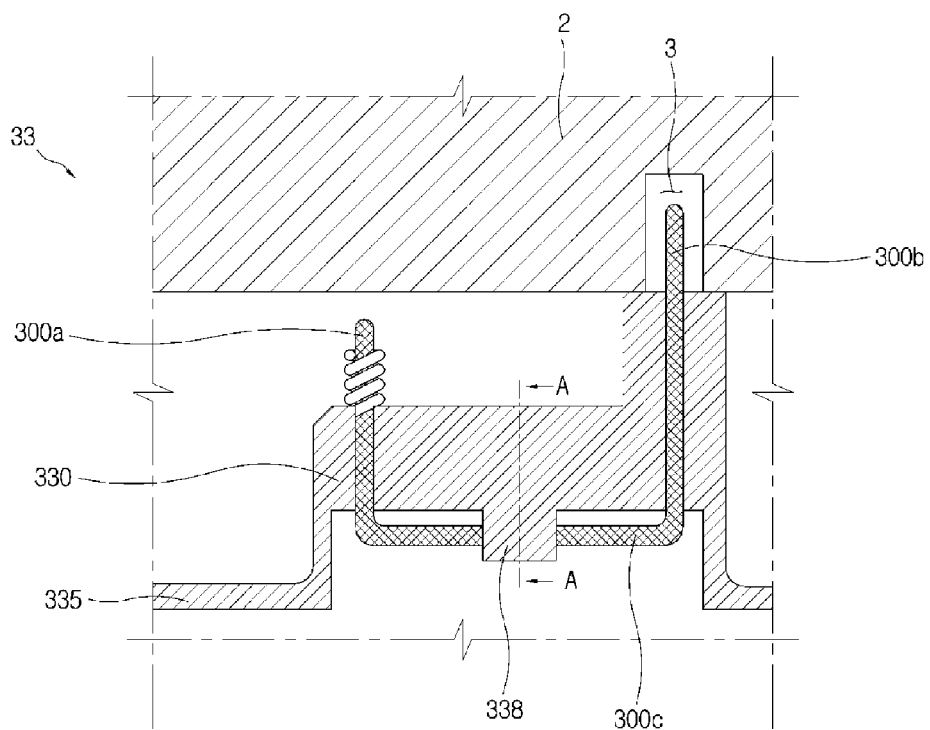
Figure 10B:
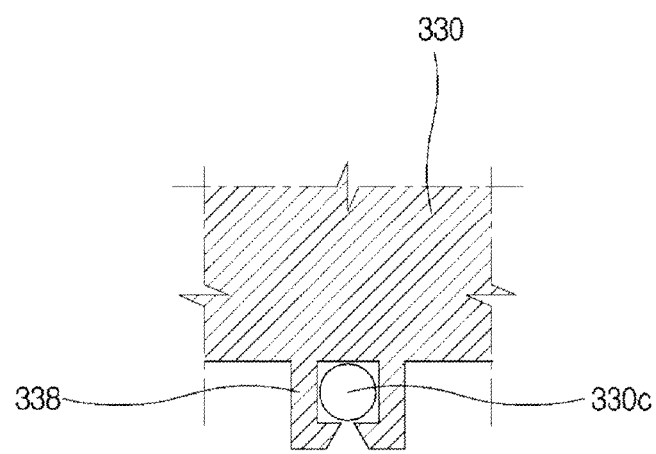

Referring to FIGS. 10A and 10B, the terminal pin 300 may be fixed to an inside of the terminal pin accommodating portion 330 by a hook portion 338. The hook portion 338 may be provided to protrude from an inner surface of the terminal pin accommodating portion 330, and the terminal pin 300 may be fitted fixedly into the hook portion 338. According to a hook structure shown in FIGS. 10A and 10B, the terminal pin 300 may be more reliably fixed to an inside of the terminal pin accommodating portion 330 than the press-in method of FIG. 9.

Figure 11:
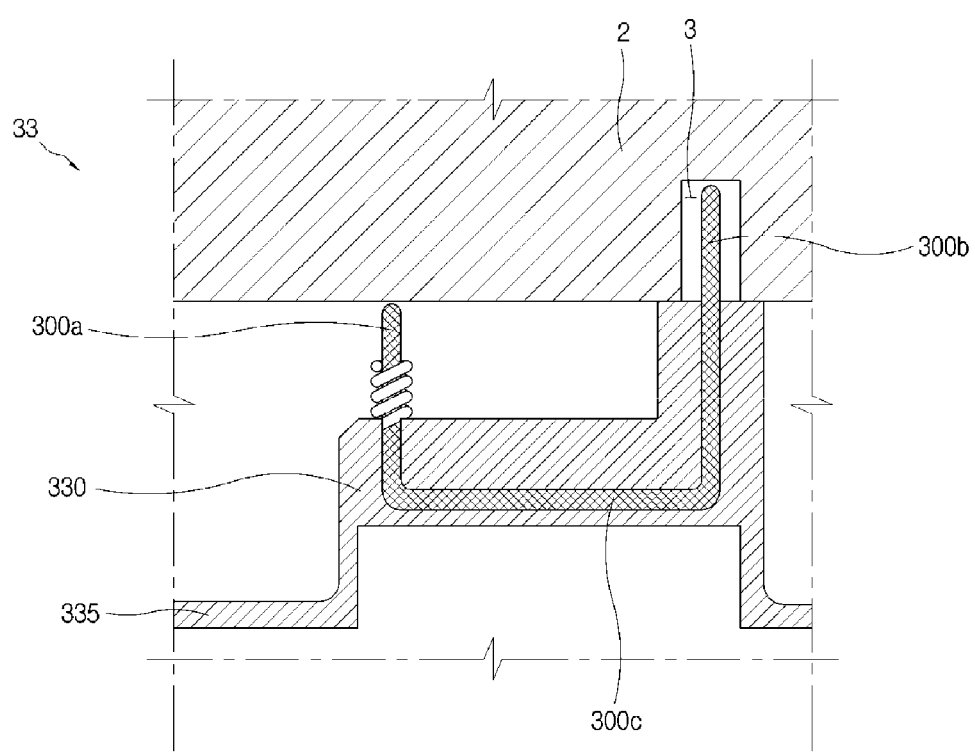

Referring to FIG. 11, the terminal pin 300 may be integrally injection-molded together with the insulator 33. The insulator 33 may be injection-molded using an insulating material. During injection molding, the terminal pin 300 formed of a conductive metal may be inserted and injection-molded. In the case of the insertion-injection of FIG. 11, a process of injection-molding the insulator 33 may become slightly complicated but the terminal pin 300 may be reliably fixed.

Figure 12:
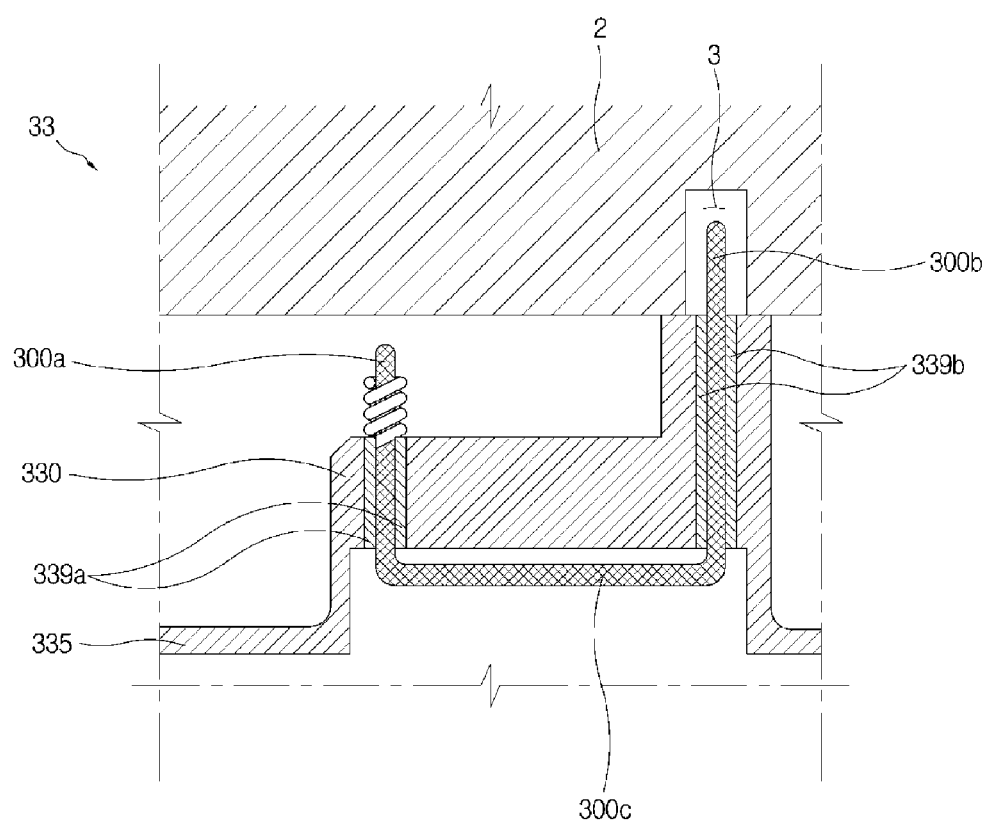

Referring to FIG. 12, the terminal pin 300 may be fixed by adhesive portions 339a and 339b provided between the terminal pin 300 and the inner surface of the terminal pin accommodating portion 330, which forms the through holes 332 and 333 formed in the terminal pin accommodating portion 330. The adhesive portions 339a and 339b may be adhesives or adhesive tapes. The terminal pin 300 may be accommodated fixedly in the terminal pin accommodating portion 330 by the adhesive portions 339a and 339b.

Figure 13:
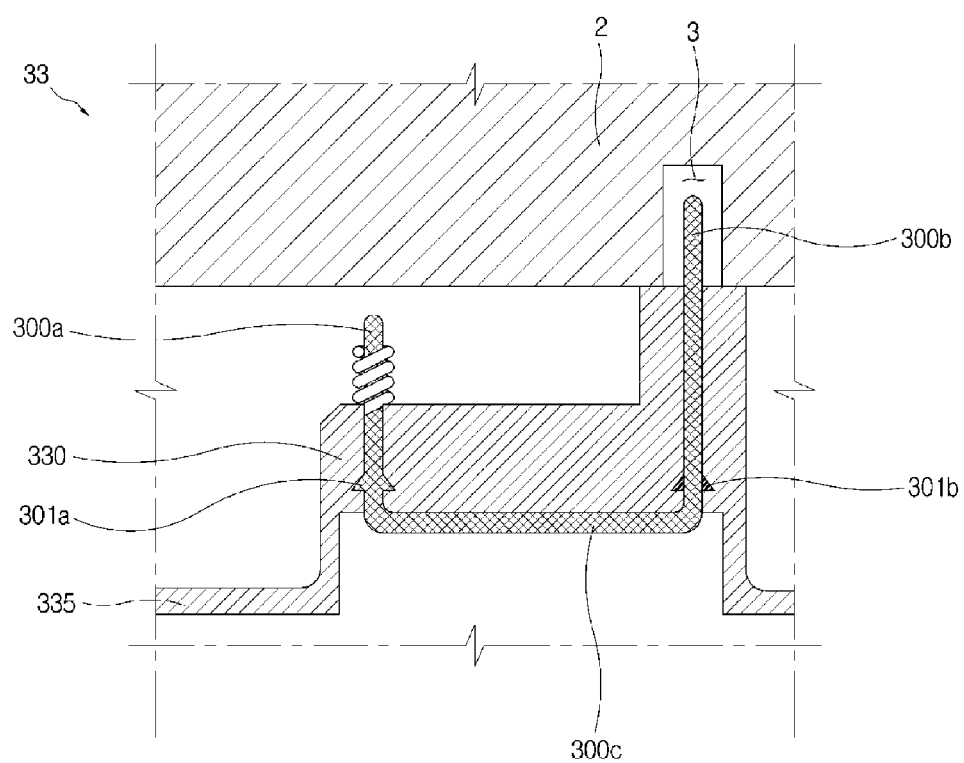

Referring to FIG. 13, the terminal pin 300 may be fixed to the terminal pin accommodating portion 330 by hook portions 301a and 301b provided on one side of the terminal pin 300. The hook portions 301a and 30 lb may be provided on at least one of the first terminal pin 300a and the second terminal pin 300b. The hook portions 301a and 301b are interfered with the inner surface of the terminal pin accommodating portion 330, which forms the through holes 332 and 333 to fix the terminal pin 300 not to go through the through holes 332 and 333. A structure in which the terminal pin 300 is accommodated in and fixed to the terminal pin accommodating portion 330 is not limited to the above description.

Figure 14:
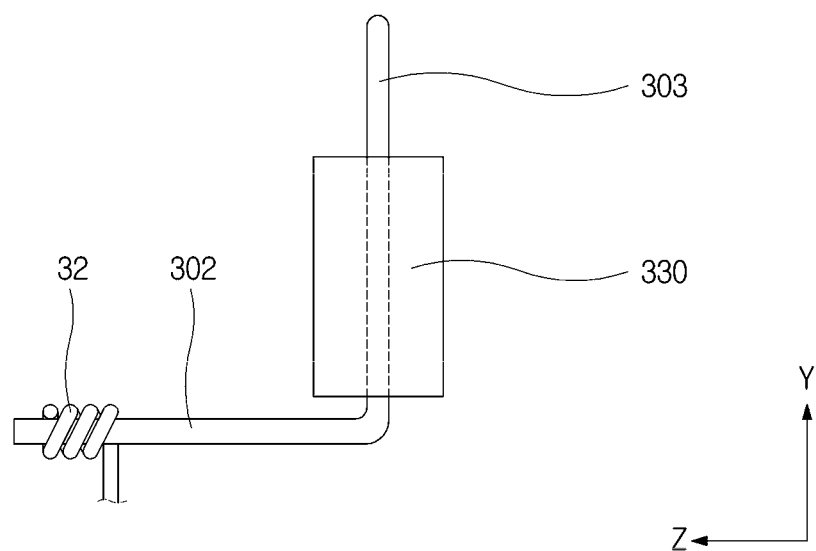
FIGS. 14 to 16 are views illustrating various shapes of the terminal pin according to this disclosure.
Figure 15:
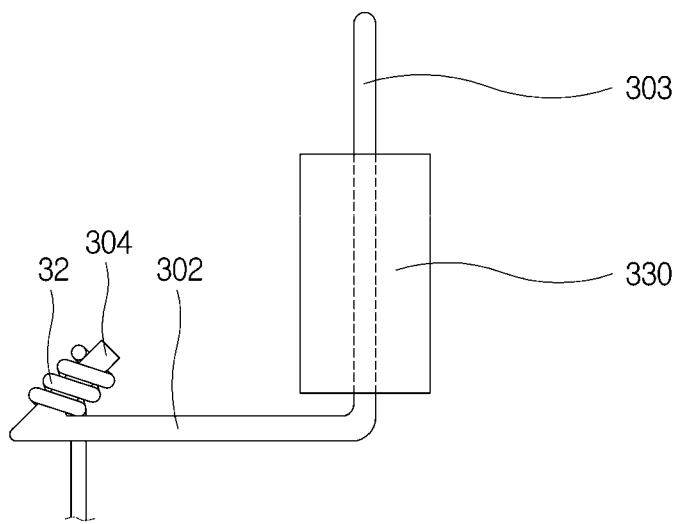
Figure 16:
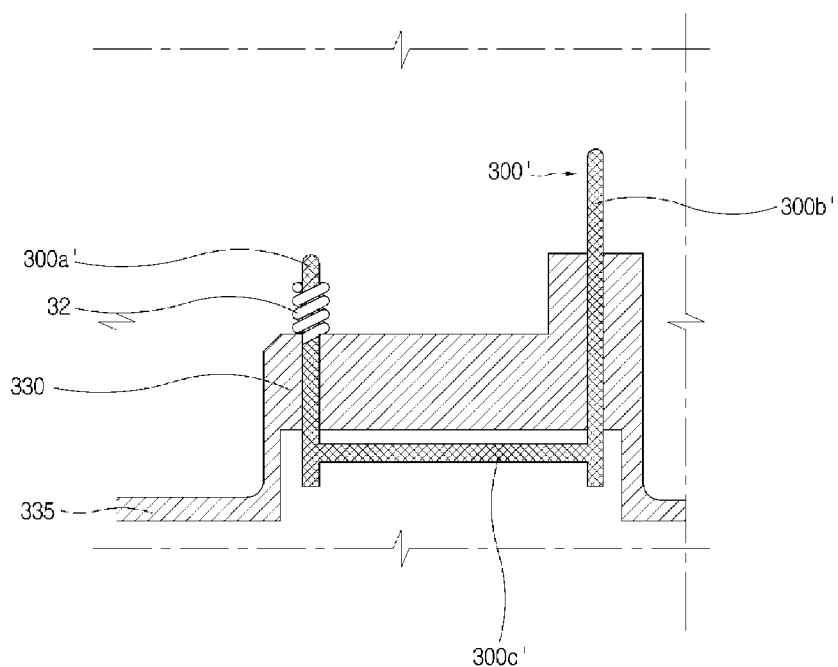

FIGS. 14 to 16 are views illustrating various shapes of the terminal pin 300 according to this disclosure. Referring to FIGS. 14 to 16, the terminal pin 300 is not limited to a U shape or V shape but may be provided to be in various shapes. Referring to FIG. 14, terminal pins 302 and 303 may be bent to be in an L shape. The terminal pins 302 and 303 may include a first terminal pin 302 inserted into the terminal pin accommodating portion 330 and a second terminal pin 303 bent from the first terminal pin 302. The second terminal pin 303 may be connected to the stator coil 32. A part of the first terminal pin 302 may protrude outside the terminal pin accommodating portion 330 through a through hole formed in the terminal pin accommodating portion 330. The protruding first terminal pin 302 may be electrically connected to the PCB 20 shown in FIG. 2.

In FIG. 5, both the first terminal pin 300a and the second terminal pin 300b extend in a y-axis direction. However, in FIG. 14, the first terminal pin 302 may extend in a z-axis direction and the second terminal pin 303 may extend in the y-axis direction. Referring to FIG. 15, an end 304 of the first terminal pin 302 which extends in the z-axis direction as shown in FIG. 14 may be bent in a random direction. The bent first terminal pin 302 may be connected to the stator coil 32.

FIG. 16 illustrates a terminal pin 300' provided to be in an H shape including a first terminal pin 300a', a second terminal pin 300b', and a third terminal pin 300c'. Except the shape of the terminal pin 300', the structure of the terminal pin 300 shown in FIGS. 1 to 13 may be applied similarly to a structure in which the terminal pin 300' is accommodated in and fixed to the terminal pin accommodating portion 330. The shape of the terminal pin is not limited to the above description but may be various.

As is apparent from the above description, a motor may prevent an injection material from penetrating into a gap between a terminal pin of a stator and a mold and being stuck to an outer circumferential surface of the terminal pin while a motor housing is injection-molded. The injection material is prevented from being stuck to the outer circumferential surface of the terminal pin, thereby preventing the terminal pin from badly carrying currents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A motor comprising:
   a stator including stator cores wound with a coil;
   a rotor disposed in the stator and configured to interact with the stator and to rotate;
   a shaft mounted on the rotor and configured to rotate with the rotor;
   a printed circuit board (PCB) electrically connected to the coil;
   an insulator formed of an insulating material and mounted on the stator; and
   a terminal pin mounted on the insulator to connect the coil with the PCB,
   wherein the terminal pin is provided in a bent shape and includes a first terminal pin and a second terminal pin that extend in a same direction and a third terminal pin that connects the first terminal pin with the second terminal pin,
   wherein a terminal pin accommodating portion that protrudes in an extension direction of the shaft is provided in one side of the insulator and the terminal pin is accommodated in the terminal pin accommodating portion, and
   wherein the terminal pin accommodating portion is configured to accommodate the first terminal pin through a first through hole and the second terminal pin through a second through hole.

2. The motor of claim 1, wherein the terminal pin accommodating portion comprises a terminal pin supporting portion that further protrudes in the extension direction of the shaft.

3. The motor of claim 2, wherein the second terminal pin externally protrudes through the second through hole formed in the terminal pin supporting portion.

4. The motor of claim 3, further comprising a housing that forms an external shape and is integrally injection-molded with the stator.

5. The motor of claim 4, wherein during the injection molding of the housing, the second terminal pin is located in an accommodating portion that is a space formed in a mold and the terminal pin supporting portion is in contact with the mold located around the accommodating portion and configured to shield the accommodating portion from receiving an injection material.

6. The motor of claim 1, wherein the second terminal pin is externally exposed through the second through hole formed in the terminal pin accommodating portion.

7. The motor of claim 6, wherein the second terminal pin is connected to the PCB through soldering.

8. The motor of claim 1, wherein the coil is connected to the first terminal pin.

9. The motor of claim 1, wherein a length of the second terminal pin is greater than a length of the first terminal pin.

10. The motor of claim 1, wherein:
    the terminal pin accommodating portion comprises a terminal pin supporting portion that further protrudes in an extension direction of the shaft, and
    the second through hole is formed in one side of the terminal pin supporting portion.

11. The motor of claim 10, wherein the second terminal pin passes through the second through hole formed in the terminal pin supporting portion and is electrically connected to the PCB.

12. The motor of claim 1, wherein the terminal pin is fixed to the terminal pin accommodating portion through a hook structure.

13. The motor of claim 1, wherein the insulator is injection-molded while the terminal pin is inserted therein to be located in the terminal pin accommodating portion.

14. A motor comprising:
    a housing that forms an external shape;
    a stator body comprising stator cores wound with a coil;
    an insulator formed of an insulating material and mounted on one side of the stator body;
    a printed circuit board (PCB) provided on the one side of the stator body; and
    a terminal pin mounted on the insulator to electrically connect the coil with the PCB,
    wherein the terminal pin is provided in a bent shape and includes a first terminal pin and a second terminal pin that extend in a same direction and a third terminal pin that connects the first terminal pin with the second terminal pin,
    wherein the insulator comprises a terminal pin accommodating portion configured to protrude toward one side,
    wherein the terminal pin accommodating portion comprises a terminal pin supporting portion that further protrudes toward the one side,
    wherein the terminal pin accommodating portion is configured to accommodate the first terminal pin through a first through hole and the second terminal pin through a second through hole, and
    wherein the first terminal pin externally protrudes through the first through hole formed in the terminal pin supporting portion.

15. The motor of claim 14, wherein the terminal pin is formed to be bent in such a way that the first terminal pin externally protrudes through the first through hole formed in the terminal pin accommodating portion and the second terminal pin externally protrudes through the second through hole formed in the terminal pin supporting portion.

16. The motor of claim 15, wherein the first terminal pin includes a protruding length from the terminal pin accommodating portion that is smaller than the second terminal pin.

17. The motor of claim 14, wherein when the housing is injection-molded while the stator body is inserted, the terminal pin supporting portion is in surface contact with a mold.

18. The motor of claim 17, wherein:
the mold comprises an accommodating portion that accommodates a protruding second terminal pin, and
the terminal pin supporting portion is configured to shield the accommodating portion from receiving an injection material.

* * * * *